(12) United States Patent
Pinney

(10) Patent No.: US 6,558,823 B1
(45) Date of Patent: May 6, 2003

(54) METHOD AND ARTICLE OF MANUFACTURE TO EFFECT AN OXYGEN DEFICIENT FUEL CELL

(76) Inventor: James D. Pinney, 3830 S. 86th E. Ave., Tulsa, OK (US) 74145

( * ) Notice: Subject to any disclaimer, the term of this patent is extended or adjusted under 35 U.S.C. 154(b) by 0 days.

(21) Appl. No.: 09/517,690

(22) Filed: Mar. 2, 2000

(51) Int. Cl.$^7$ .................... H01M 8/00; F04F 1/18; B64D 1/00
(52) U.S. Cl. ................... 429/12; 137/206; 244/135 R
(58) Field of Search ............... 429/12, 13, 34, 429/25, 18, 38, 39, 17; 137/206, 209, 269; 244/135 R

(56) References Cited

U.S. PATENT DOCUMENTS

| | | | |
|---|---|---|---|
| 2,711,842 A | 6/1955 | Jonas | 220/88 |
| 2,870,936 A | 1/1959 | Clayton | 220/88 |
| 3,237,894 A | 3/1966 | Wight, Jr. | 244/129 |
| 3,587,618 A | 6/1971 | Kenyon | 137/87 |
| 3,590,559 A | 7/1971 | Bragg | 55/160 |
| 3,732,668 A * | 5/1973 | Nichols | 220/88.3 |
| 3,775,282 A * | 11/1973 | Craft et al. | 204/266 |
| 3,788,040 A | 1/1974 | Bragg et al. | 55/160 |
| 3,847,298 A | 11/1974 | Hamilton | 220/88 B |
| 3,856,465 A * | 12/1974 | Lipscomb | 252/964 |
| 4,378,920 A * | 4/1983 | Runnels et al. | 137/209 |
| 4,657,826 A * | 4/1987 | Tajima | 429/12 |
| 4,680,240 A * | 7/1987 | Furukawa et al. | 429/13 |
| 5,178,969 A * | 1/1993 | Amemiya | 429/26 |
| 5,248,567 A * | 9/1993 | Amemiya et al. | 429/20 |
| 6,238,815 B1 * | 5/2001 | Skala et al. | 429/17 |

* cited by examiner

Primary Examiner—Stephen Kalafut
Assistant Examiner—Raymond Alejandro
(74) Attorney, Agent, or Firm—Head, Johnson and Kachigian

(57) ABSTRACT

A method and article of manufacture for effecting an oxygen deficient fuel cell wherein an oxygenless gas is introduced to the internal structure of a fuel cell as fuel volume is diminished thereby displacing ambient air containing oxygen with said oxygenless gas.

12 Claims, 1 Drawing Sheet

METHOD AND ARTICLE OF MANUFACTURE TO EFFECT AN OXYGEN DEFICIENT FUEL CELL

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The instant invention relates in general to fuel cells and in particular to a method and article of manufacturing for replacing ambient air containing oxygen within a fuel cell with an oxygenless gas, such as, but not limited to, propane, helium, or nitrogen.

BACKGROUND OF THE INVENTION

The practice of inerting a gas into a fuel cell, particularly fuel cells such as aircraft fuel tanks is well known in the art. For example:

U.S. Pat. No. 2,870,936 issued to A. J. Clayton on Jan. 27, 1959 discloses a closed system for venting and inerting aircraft fuel tanks.

U.S. Pat. No. 3,587,618 issued to Richard L. Kenyon on Jun. 28, 1971 discloses a fire and explosion prevention system for aircraft fuel tanks that utilizes an inert gas for pressurizing the fuel tanks and in which means is provided for preventing over-pressurization of the fuel tanks in case of either clogging of vent passages that normally connect the fuel tanks to atmosphere or failure of vent valves to open, hereafter referred to as the "618" patent.

Quite distinct from the '618 patent which uses liquid nitrogen and thus requires refrigeration to maintain the operational effectiveness of such nitrogen, the instant invention utilizes a gaseous form of nitrogen. A further distinguishing characteristic and benefit of the instant invention is its utilization of a containment vessel requiring far less space than any refrigeration unit associated with the '618 invention. Further, the instant invention eliminates the attendant weight of the '618 refrigeration unit by replacing the '618's liquid nitrogen with a gaseous form of nitrogen contained within a comparatively small pressurized tank.

U.S. Pat. No. 3,590,559 issued to Kenneth R. Bragg et al. on Jul. 6, 1971 discloses an inerting system to prevent fire and explosion within aircraft or other fuel tanks by maintaining in the ullage thereof an inert atmosphere and by removing oxygen from the fuel when pressure on the fuel decreases, as during the climb of aircraft, such removal of oxygen being accomplished by injecting a mixture of fuel and an inert gas into the fuel supply through submerged nozzles.

U.S. Pat. No. 3,732,668 issued to Richard A. Nichols on May 15, 1973 discloses a system for inerting aircraft fuel tanks comprising mixing of the fuel and an inert gas within a tube whereby the inert gas scrubs the fuel of oxygen dissolved therein and dilutes the same, the mixture being discharged from the tube into the fuel tank where the inert gas and the oxygen rise to the tank vapor space where a portion of the same may be vented to atmosphere but in any case the oxygen content in the vapor space is less than about 12 percent whereby flame and explosion cannot propagate within the tank.

U.S. Pat. No. 3,788,040 issued to Kenneth R. Bragg et al. on Jan. 29, 1974 discloses a method of maintaining the ullage of a previously inerted aircraft fuel tank in the inert condition under which combustion cannot take place within the tank during the after filling of the tank with liquid fuel, and during flight of the aircraft. The method utilizes the oxygen lean ullage gases for scrubbing oxygen from incoming fuel during filling of the tank, separating the gases having scrubbed oxygen therein from the incoming fuel and venting the same to the exterior of the tank so as not to raise the oxygen content of the gases remaining in the ullage.

U.S. Pat. No. 4,378,920 issued to Joe N. Runnels et al. on Apr. 5, 1983 discloses a combustibly inert air supply system and method wherein compressed air is directed through an inert gas generator which removes oxygen to produce a nitrogen enriched, combustibly inert air or gas. The converter is sized to only meet the relatively low flow rate requirements of the system during which times the combustibly inert air or gas is delivered directly to a utilization site. The system further includes a high pressure storage container in which a pressurized precharge of the combustibly inert air or gas is stored. Combustibly inert air is released from such high pressure storage container for providing the higher flow rate requirements of the system. The system may be used aboard an aircraft for inerting fuel tanks. It may include a separate compressor for filling the high pressure storage container.

In view of the limitations and disadvantages of the afore cited prior art, it is apparent that what is needed is an improved method and article of manufacture to effect an oxygen deficient fuel cell which will minimize potential for flame and explosion within an aircraft fuel tank. A need met and exceeded by the instant invention.

BRIEF SUMMARY OF THE INVENTION

A method and article of manufacture to effect an oxygen deficient fuel cell which will minimize the potential for flame and explosion occurring within an aircraft fuel tank.

A first containment vessel contains a pressurized oxygen-free gas, such as, but not limited to, propane, nitrogen or helium. The containment vessel is first connected to a pressure regulator via a pressurized conduit. The pressurized conduit can be constructed of any material capable of transporting oxygen-free gas in a pressurized environment. Said conduit is utilized to facilitate the transport of said oxygen-free gas from the first containment vessel to and through a pressure regulator continuing to and through a demand regulator exiting said demand regulator and entering into a fuel cell. The fuel cell also comprises a exiting gas outflow conduit and outflow valve. In an alternative embodiment of the instant invention an oxygen sensor can be attached to either the exiting gas outflow conduit, the outflow valve or integrated within the outflow valve to sample for and signal the presence of oxygen within the fuel cell.

The invention is practiced by charging the internal portion of a fuel cell with a hydrocarbon based fuel, such as but not limited to aviation fuel.

An object of the instant invention is to minimize the potential for flame and explosion occurring within an aircraft fuel tank.

A further object of the instant invention is to eliminate excessive weight restrictions attendant to prior art approaches to minimize the potential for flame and explosion occurring within an aircraft fuel tank.

Yet another object of the instant invention is to provide a comprehensive, yet uncomplicated method and apparatus to effect an oxygen deficient fuel cell.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

Figure 1:
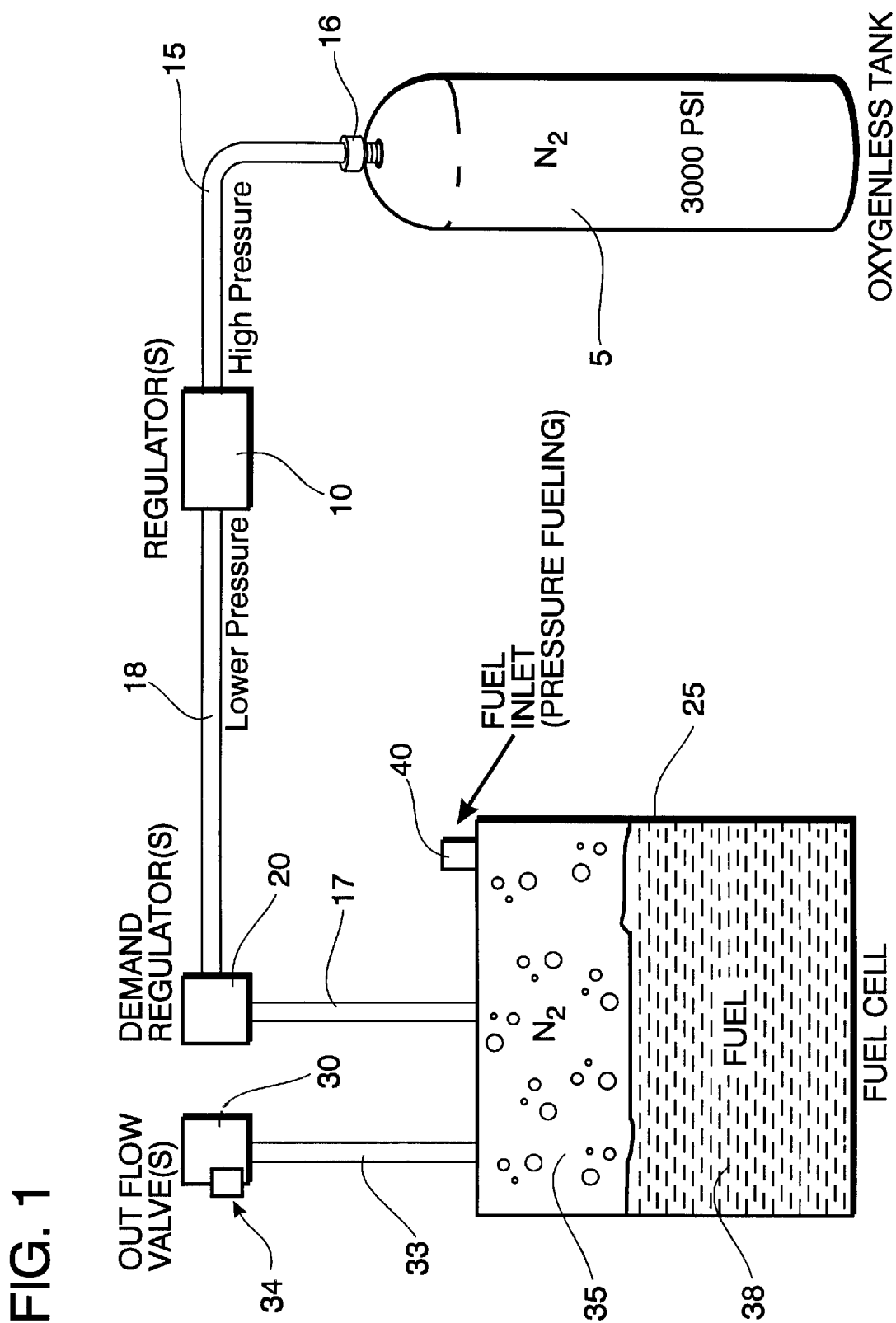
FIG. 1 is an illustration of operational components necessary to effect the practice of the invention's preferred embodiment.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

FIG. 1 illustrates the invention's preferred embodiment for effecting an oxygen deficient fuel cell. A first containment vessel 5 contains a pressurized oxygen-free gas, such as, but not limited to, propane, nitrogen or helium. The containment vessel is first connected to a pressure regulator 10 via a pressurized conduit 15. The pressurized conduit 15 can be constructed of any material capable of transporting oxygen-free gas in a pressurized environment. Said conduit 15 is utilized to facilitate the transport of said oxygen-free gas from said first containment vessel 5 to and through a pressure regulator 10 at a reduced pressure 16 continuing to and through an electric, vacuum or otherwise actuated demand regulator 20 exiting said demand regulator 20 and entering into a fuel cell 25. The fuel cell 25 also comprises a exiting outflow conduit 33 and outflow valve 30. Said outflow valve 30 designed and purposed to ensure pressure limits within the fuel cell 25 do not exceed limits established by the fuel cell manufacturer for safe and efficient operation of the cell. In an alternative embodiment of the instant invention an oxygen sensor 34 can be housed within the fuel cell 25, attached to the exiting gas outflow conduit 33, the outflow valve 30 or integrated within the outflow valve 30 to sample for and signal the presence of oxygen within, or exiting the fuel cell 25. For applications presently embodying a one way outflow valving mechanism, such as certain aircraft types, the present invention, in an alternative embodiment can be fitted to accommodate the existing mechanism for venting purposes.

The invention is practiced by charging the internal portion of a fuel cell 25 with a hydrocarbon based fuel, such as but not limited to aviation fuel. Said charging effectuates the displacement of pre-existing ambient air residing within the fuel cell 25 insufficient volume effecting a combustionable flashpoint. Fueling (a.k.a. "charging") continues until such time as the fuel cell 25 is either filled with the introduced fuel source 38 or alternatively, until a desired amount of fuel 38 has entered the fuel cell 25. Should the fuel cell 25 contain oxygen levels in excess of that necessary to effect combustion, the cell 25 is further purged of such oxygen laden ambient air by further introducing said oxygen deficient gas is transported from the first containment vessel 5 through pressure regulator 10 continuing through demand regulator 20 and into the fuel cell 25 until ambient air within said fuel cell 25 possesses oxygen levels below that necessary to effect and system combustion. Said purging just described to be effectuated by overriding demand regular 20 pressure limitations and allowing for venting of said ambient air via the invention's gas outflow conduit 33 and outflow valve 30. Though the present invention allows for varying degrees of pressurization, it has been determined through experimentation and modeling that for aviation purposes, that the oxygen-free gas having been initially pressurized to approximately 3000 psi while resident in a first containment vessel 5, such pressure should be reduced to an approximate effective operating pressure of 75 psi upon exiting 18 the pressure regulator 10 through the demand regulator 20, then lowered again 17 to a pressure consistent with that existing within the fuel cell 25. As other applications of the instant invention may require varying degrees of pressurization, those reasonably skilled in the relevant art can effect an operationally efficient pressurization for such applications by modifying pressure regulator 10 and demand regulator 20 settings.

The instant invention maintains its operational efficiency by introducing said pressurized oxygen deficient gas to the internal portion of the fuel cell simultaneously with the diminishing of the previously introduced fuels 38 volume. As the fuel volume is diminished within the internal portion of the fuel cell 25 the demand regulator 20 allows for the further introduction of oxygen-free gas 35 into the fuel cell 25.

The invention further provides for releasing said pressurized oxygen deficient gas 35 whenever the pressure within the internal structure of the fuel cell exceeds a pressure necessary to effectuate and maintain application operational efficiency. Such exiting of oxygen-free gas 35 is facilitated by an exiting gas outflow conduit 33 attached to an outflow valve 30.

An alternative embodiment of the instant invention would allow for quick connect/disconnect components to be attached to any juncture between the pressurized conduit 15 and first containment vessel 5, pressure regulator 10, demand regulator 20, and fuel cell 25. Said quick connect/disconnect means may also be employed with respect to the utilization of the upflow exiting conduit 33, outflow valve 30 and/or oxygen sensor 34. As will readily be appreciated by those skilled in the art, the ability for quick connect/disconnect greatly reduces or eliminates the labor associated with removing and replacing operational components of the instant invention while reducing fatigue on more strenuously attached coupling mechanisms.

The instant invention application can be readily appreciated and envisioned with respect to its use in the aviation industry. In such an application, the fuel cell 25 would be represented as the fuel containment capacity of an aircraft fuel cell typically manifested as the internal construct of an aircraft wing. The containment vessel within which the oxygenless gas resides prior to introduction to the fuel cell 25 can be located in any convenient environment allowing for rapid servicing by ground personnel during routine practice of the invention. Such locations would include but not be limited to an airplane cockpit, tail structure, internal cabin, or any space available which would provide adequate load bearing and volume capacity to house the containment vessel 5 for an appropriate aircraft application. Such environments would typically vary with respect to the aircraft utilized. A 747 passenger airliner would obviously require a greater space to house the containment vessel 5 while smaller applications in private aircrafts would require less space.

Though the invention in its preferred embodiment utilizes a demand regulator 20 to determine when additional oxygen-free gas should be introduced to the fuel cell 25, a combination of valves allowing for such introduction and sensors well known to those skilled in the art could be used in an alternative configuration.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Although the present invention has been described with reference to the aviation industry, it is not limited to this particular application. Utilization of the present invention in any application utilizing volatile fuel within a pressurized fuel cell can be ready appreciated by those skilled in the art.

What is claimed is:

1. An oxygen deficient fuel cell providing continuous functionality consisting of:
    a containment vessel containing a pressurized oxygen free gas;
    a pressure regulator attached to said containment vessel via a pressurized conduit; said pressurized conduit capable of transporting said pressurized oxygen free gas;
    a demand regulator attached to said pressure regulator via said pressurized conduit;
    a fuel cell attached to said demand regulator via said pressurized conduit; and
    an outflow valve attached to said fuel cell via an exiting gas outflow conduit.

2. The fuel cell of claim 1 wherein said cell comprises the interior portion of an aircraft wing.

3. The fuel cell of claim 1 wherein said cell comprises that portion of an aircraft used to accommodate aircraft fuel.

4. The fuel cell of claim 1 wherein said pressurized conduit is connected to said containment vessel via a connecting means allowing for rapid attachment and detachment of said containment vessel to said pressurized conduit.

5. The fuel cell of claim 1 further comprising an oxygen detection sensor attached to said exiting gas outflow conduit.

6. The fuel cell of claim 1 further comprising an oxygen detection sensor attached to said outflow valve.

7. The fuel cell of claim 1 further comprising an oxygen detection sensor integrated within said outflow valve.

8. The fuel cell of claim 1 wherein said oxygen free gas is nitrogen.

9. The fuel cell of claim 1 wherein said oxygen free gas is helium.

10. The fuel cell of claim 1 further comprising a plurality of containment vessels, pressure regulators, demand regulators, fuel cells, pressurized conduits, exiting gas outflow conduits and out flow valves.

11. The fuel cell of claim 1 further comprising a plurality of pressure regulators, demand regulators, fuel cells, pressurized conduits, exiting gas outflow conduits and out flow valves.

12. An oxygen deficient fuel cell providing continuous functionality comprising:
    a containment vessel containing pressurized oxygen free propane;
    a pressure regulator attached to said containment vessel via a pressurized conduit; said pressurized conduit capable of transporting said pressurized oxygen free propane gas;
    a demand regulator attached to said pressure regulator via said pressurized conduit;
    a fuel cell attached to said demand regulator via said pressurized conduit; and
    an outflow valve attached to said fuel cell via an exiting gas outflow conduit.

* * * * *

United States Patent and Trademark Office
Certificate

Patent No. 6,558,823 B1                                Patented: May 6, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James D. Pinney, Tulsa, OK; and Larry D. Pinney, Jr., Bartlesville, OK.

Signed and Sealed this Twenty-eighth Day of March 2006.

PATRICK RYAN
*Supervisory Patent Examiner*
Art Unit 1745